United States Patent [19]
Consolazio et al.

[11] Patent Number: 6,002,920
[45] Date of Patent: Dec. 14, 1999

[54] METHOD AND DEVICE FOR MODIFYING A RADIO FREQUENCY RANGE OF A RADIO TRANSCEIVER

[75] Inventors: Stephen James Consolazio, Arlington Heights; Albert Ferek, Wood Dale, both of Ill.

[73] Assignee: Northrop Grumman Corporation, Los Angeles, Calif.

[21] Appl. No.: 09/081,155

[22] Filed: May 19, 1998

[51] Int. Cl.$^6$ ................................................ H04B 1/034
[52] U.S. Cl. .................... 455/82; 455/83; 455/78; 333/101
[58] Field of Search ................................ 455/78, 79, 80, 455/82, 83, 86, 255, 257, 258, 259, 265, 73; 333/101, 124, 126–127, 129, 132; 348/164; 375/272, 219

[56] References Cited

U.S. PATENT DOCUMENTS

| | | |
|---|---|---|
| 3,622,884 | 11/1971 | Kent . |
| 4,200,870 | 4/1980 | Gabbitas . |
| 4,637,073 | 1/1987 | Selin et al. ............................... 455/78 |
| 5,239,685 | 8/1993 | Moe et al. ................................ 455/73 |
| 5,354,611 | 10/1994 | Arthur et al. ........................... 428/325 |
| 5,423,080 | 6/1995 | Perret et al. .............................. 455/90 |
| 5,477,532 | 12/1995 | Hoshigami et al. . |
| 5,483,679 | 1/1996 | Sasaki ...................................... 455/86 |
| 5,495,255 | 2/1996 | Komatsu et al. . |
| 5,628,053 | 5/1997 | Araki et al. .............................. 455/86 |
| 5,812,612 | 9/1998 | Saito ....................................... 375/272 |
| 5,821,992 | 10/1998 | Saylor .................................... 348/164 |
| 5,825,813 | 10/1998 | Na ......................................... 375/219 |

*Primary Examiner*—Doris H. To
*Attorney, Agent, or Firm*—Terry J. Anderson; Karl J. Hoch, Jr.

[57] ABSTRACT

A method and device for modifying a frequency range of a radio transceiver by mixing a signal to be transmitted by the transceiver with the output of a local oscillator so as to change the frequency thereof to a desired frequency for transmission and by mixing a received radio transmission with the output of a local oscillator so as to change the frequency thereof to a frequency within the nominal reception band of the transceiver.

30 Claims, 2 Drawing Sheets

METHOD AND DEVICE FOR MODIFYING A RADIO FREQUENCY RANGE OF A RADIO TRANSCEIVER

FIELD OF THE INVENTION

The present invention relates generally to radio communications and more particularly to a method and device for modifying a frequency range of a radio transceiver by mixing a signal to be transmitted by the transceiver with the output of a local oscillator so as to change the frequency thereof to a desired frequency for transmission and by mixing a received radio transmission with the output of a local oscillator so as to change the frequency thereof to a frequency within the nominal reception band of the transceiver.

BACKGROUND OF THE INVENTION

Radio transceivers for facilitating point-to-point communications are well known. Such radio transceivers make comprise either hand held transceivers, i.e., walkie talkies, or base station transceivers which are typically larger and more powerful than the hand held transceivers.

As those skilled in the art will appreciate, contemporary radio transceivers operate within a predetermined band of frequencies so as to effect radio transmission and reception.

One such band commonly used in point-to-point radio communications is the 2,400–2,488.35 MHz radio band. However, as those skilled in the art will appreciate, this band is subject to overuse, such that undesirable interference between signals frequently occurs. As such it is desirable to provide means for converting radio signals normally transmitted in the 2,400–2,488.35 MHz band so that they may be transmitted in another, less crowded radio band. One such less crowded radio band is the 5,725–5,850 MHz industrial, scientific, and medical (ISM) band.

It would further be desirable to provide means for easily re-configuring an existing hand-held or base station transceiver for use in the 5,725–5,850 MHz (ISM) band which does not involve extensive or difficult modification of the transceiver. Those skilled in the art will appreciate that radio transceivers may be modified so as to change or extend the operational frequency band thereof by changing or adding crystals and/or by the tuning local oscillators etc. However, such contemporary methods for changing or extending the operational band of a radio transceiver are comparatively difficult to perform, require technical expertise, and are expensive. Furthermore, such contemporary methods for changing the band of a radio transceiver do not readily accommodate changing back to the original band thereof. That is, any process performed to change the band of a radio transceiver according to contemporary methodology must be reversed, so as to allow the radio transceiver to operate in the original band thereof. That is, any crystals which were changed so as to accommodate the new frequency band must be replaced with the original crystals and/or any local oscillators which have been re-tuned must be tuned again to the original frequency thereof.

In view of the forgoing, it would be desirable to provide a means for rapidly and easily changing the operating frequency of a transceiver, particularly wherein such means may be easily bypassed to as to operate the transceiver at the original frequency thereof, when desired.

SUMMARY OF THE INVENTION

The present invention addresses and alleviates the above mentioned deficiencies associated with the prior art. More particularly, the present invention comprises an apparatus and method for modifying a frequency range of a radio receiver. The apparatus comprises a first superheterodyne circuit for changing a transmit frequency of the transceiver, a second superheterodyne circuit for changing a received frequency of the transceiver, and at least one switch for switching the first and second superheterodyne circuits into and out of electrical communication with the transceiver and in antenna. The first superheterodyne circuit, the second superheterodyne circuit, and the switches are configured to mount to the receiver and the antenna and to receive power from an antenna feed conductor.

According to the preferred embodiment of the present invention, the first superheterodyne circuit comprises a local oscillator having an output, a mixer for mixing the output of the local oscillator with a signal to be transmitted from the transceiver, a band pass filter for filtering unwanted mixing components from the mixed signal from the mixer, at least one amplifier for amplifying the mixed signal, and a low pass filter for filtering harmonics from the amplified mixed signal. The second superheterodyne circuit preferably comprises at least one amplifier for amplifying a received radio frequency signal from the antenna, a local oscillator having an output, and a mixer for mixing the output of the oscillator with the amplified signal received by the antenna.

According to the preferred embodiment of the present invention, the local oscillator of the first heterodyne circuit and the local oscillator of the second superheterodyne circuit comprise a common local oscillator. Further, according to the preferred embodiment of the present invention, the local oscillator of the first superheterodyne circuit and the local oscillator of the second superheterodyne circuit are comprised of surface mount devices which are formed upon a printed wiring board (PWB).

The first superheterodyne circuit is preferably configured so as to convert a signal being transmitted in the 2,400–2,488.35 MHz band to a signal in the 5,725–5,850 MHz band and the second superheterodyne circuit is configured so as to convert a signal being received in the 5,725–5,850 MHz band to a signal in the 2,400–2,488.35 MHz band.

DC power and control signals are preferably provided to the present invention via a single +12 volt input which is feed thereto on the center conductor of a coaxial cable which facilitates connection of the antenna to the radio receiver. In this manner, no extra wiring is need to supply the operational power and control signals for the present invention.

Further, according to the present invention, the first superheterodyne circuit, the second superheterodyne circuit, and the switches are all disposed within an aluminum housing. A first coaxial feed through is configured so as to provide a 50 ohm impedance for facilitating electrical connection of the first superheterodyne circuit, the second superheterodyne circuit, and the switches to the receiver. Similarly, a second coaxial feed through is configured so as to provide a 50 ohm impedance for facilitating electrical connection of the first superheterodyne circuit, the second superheterodyne circuit, and the switches to the antenna. The first coaxial feedthrough and the second coaxial feedthrough both preferably comprise a glass dielectric soldered to the conductive housing and a generally toroidal conductive element soldered to the conductive housing so as to maintain a 50 ohm impendence in air.

The local oscillator, switch control and power regulation circuitry is preferably formed upon a low dielectric constant printed wiring board (PWB), preferably an FR-4 printed wiring board (PWB), to reduce cost.

Further, according to the preferred embodiment of the present invention, one of the switches comprises a switch configured to automatically place the radio transceiver in electrical communication with the first superheterodyne circuit when the radio receiver is transmitting, preferably by sensing a preamble signal from the radio transceiver itself. Those skilled in the art will appreciate that various different preamble signals and means for detecting the same are suitable. Switching of the first superheterodyne circuit into electrical communication with the radio transceiver preferably occurs within approximately 60 nanoseconds of sensing of the preamble, so as to mitigate the occurrence of block errors.

According to the preferred embodiment of the present invention, the method for modifying a frequency range of a radio transceiver comprises the steps of changing a transmit frequency of the transceiver via a first superheterodyne circuit, changing receive frequency of the transceiver via a second superheterodyne circuit, and switching the first and second superheterodyne circuits into and out of electrical communication with the transceiver and an antenna. The first superheterodyne circuit, the second superheterodyne and the switches are configured to mount to the transceiver and the antenna and to receive power from an antenna feed conductor.

The step of changing a transmit frequency of the transceiver via a first superheterodyne circuit preferably comprises providing a local oscillator output and mixing the local oscillator output with a signal from the transceiver to be transmitted. Similarly, the step of changing a receive frequency of the transceiver via a second superheterodyne circuit preferably comprises providing a local oscillator output and mixing the output of the local oscillator with signal received by the antenna.

More particularly, the step of changing a transmit frequency of the transceiver via a first superheterodyne circuit preferably comprises providing a local oscillator output, mixing the output of the local oscillator with a signal from the transceiver to be transmitted, filtering unwanted mixing components from the mixer output, amplifying the mixer output signal, and filtering harmonics from the amplified mixer output signal. Similarly, the step of changing received frequency of the transceiver via a second superheterodyne circuit preferably comprises amplifying a received radio frequency signal from the antenna, providing a local oscillator output, and mixing the output of the local oscillator with the amplified signal received from the antenna.

The steps of providing a local oscillator for the first superheterodyne circuit and providing a local oscillator for the second superheterodyne circuit preferably comprise providing a common local oscillator comprised of surface mount devices formed upon a printed wiring board (PWB).

The step of changing a transmit frequency of the receiver preferably comprises converting a signal being transmitted in the 2,400–2,488.35 MHz band to a signal in the 5,725–5,850 MHz band and the step of changing a receive frequency of the transceiver preferably comprises converting a signal being received in the 5,725–5,850 MHz band to a signal in the 2,400–2,488.35 MHz band.

The method of the present invention preferably further comprises the step of providing DC power and control signal to the first superheterodyne circuit, the second superheterodyne circuit, and both switches via a single +12 volt input which if fed thereto on a center conductor of a coaxial cable which facilitates connection of the antenna to the radio transceiver.

The method of the present invention preferably further comprises the steps of disposing the first superheterodyne circuit, the second superheterodyne circuit and the switches within a conductive housing preferably a housing comprised of aluminum. Preferably, a first coaxial feedthrough is configured to provide a 50 ohm impendence in the housing for facilitating electrical connection of the first superheterodyne circuit, the second superheterodyne circuit, and the switches to the transceiver, and also providing a second coaxial feedthrough configured to provide a 50 ohm impedance in the housing for facilitating electrical connection of the first superheterodyne circuit, the second superheterodyne circuit, and the switches to the antenna. The first coaxial feedthrough and the second coaxial feedthrough preferably both comprise a glass dielectric soldered to the conductive housing and a generally toroidal conductive element, soldered to the conductive housing, so as to maintain a 50 ohm impedance in air.

According the preferred embodiment, the method of the present invention further comprises forming the local oscillator, switch control and power regulation or circuitry upon a low dielectric constant printed wiring board (PWB), preferably a FR-4 printed wiring board to reduce cost.

The present invention preferably further comprises the step of automatically placing the radio transceiver in electrical communication with the first superheterodyne circuit when the radio transceiver is transmitting, preferably via the sensing of a preamble signal provided by the radio transceiver. Preferably, the radio transceiver is placed in electrical communication with the first superheterodyne circuit within approximately 60 nanoseconds of the radio transceiver transmitting the preamble signal.

These, as well as other advantages of the present invention will be more apparent from the following description and drawings. It is understood that changes in the specific structure shown and described may be made within the scope of the claims without departing from the spirit of the invention.

DETAILED DESCRIPTION OF THE PREFERRED EMBODIMENT

The detailed description set forth below in connection with the appended drawings is intended as a description of the presently preferred embodiment of the invention, and is not intended to represent the only form in which the present invention may be constructed or utilized. The description sets forth the functions and the sequence of steps for constructing and operating the invention in connection with the illustrated embodiment. It is to be understood, however, that the same or equivalent functions may be accomplished by different embodiments that are also intended to be encompassed within the spirit and scope of the invention.

Figure 1:
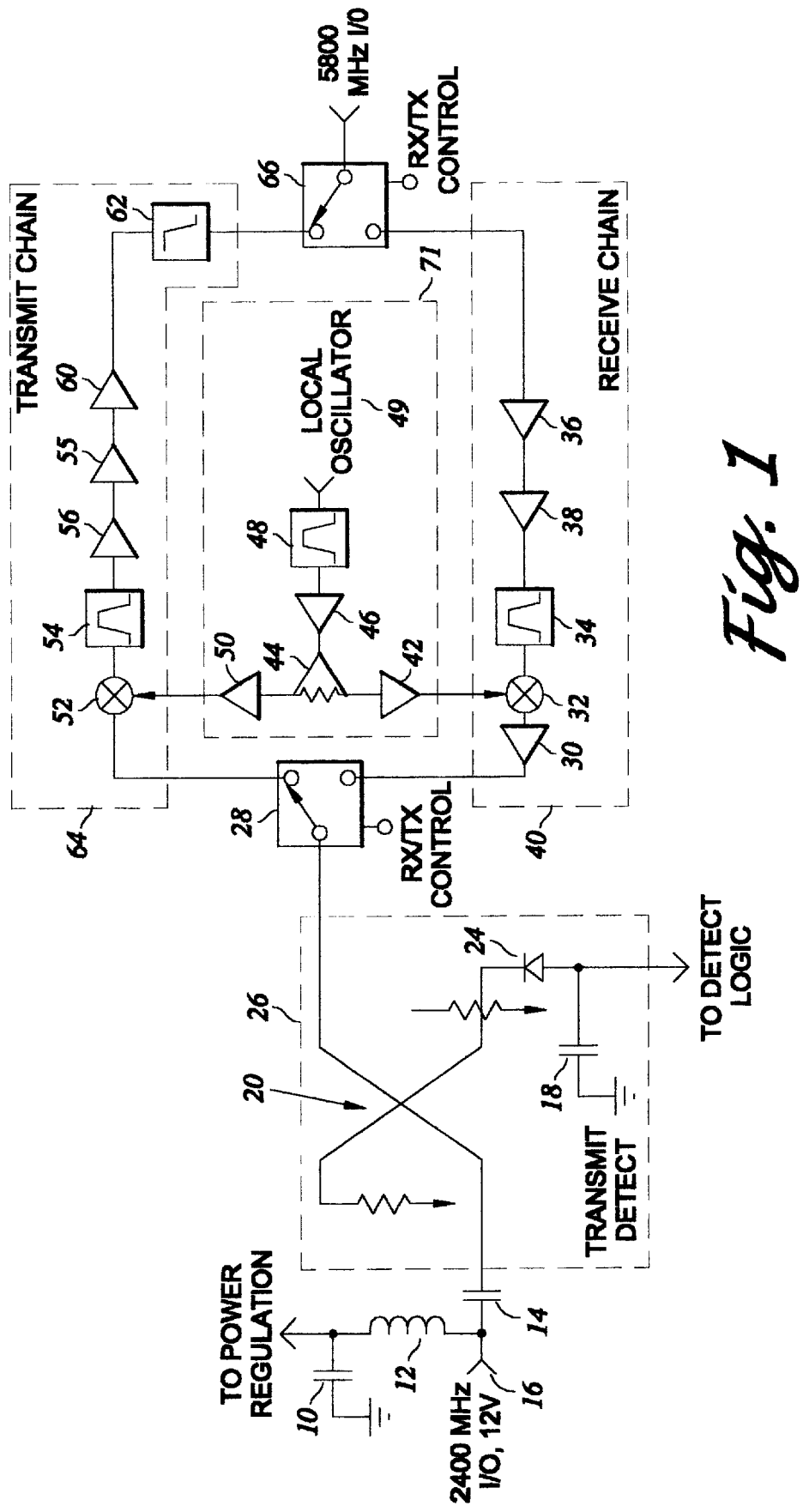
FIG. 1 is the schematic diagram of the device for modifying a frequency range of a radio transceiver of the present invention.
Figure 2:
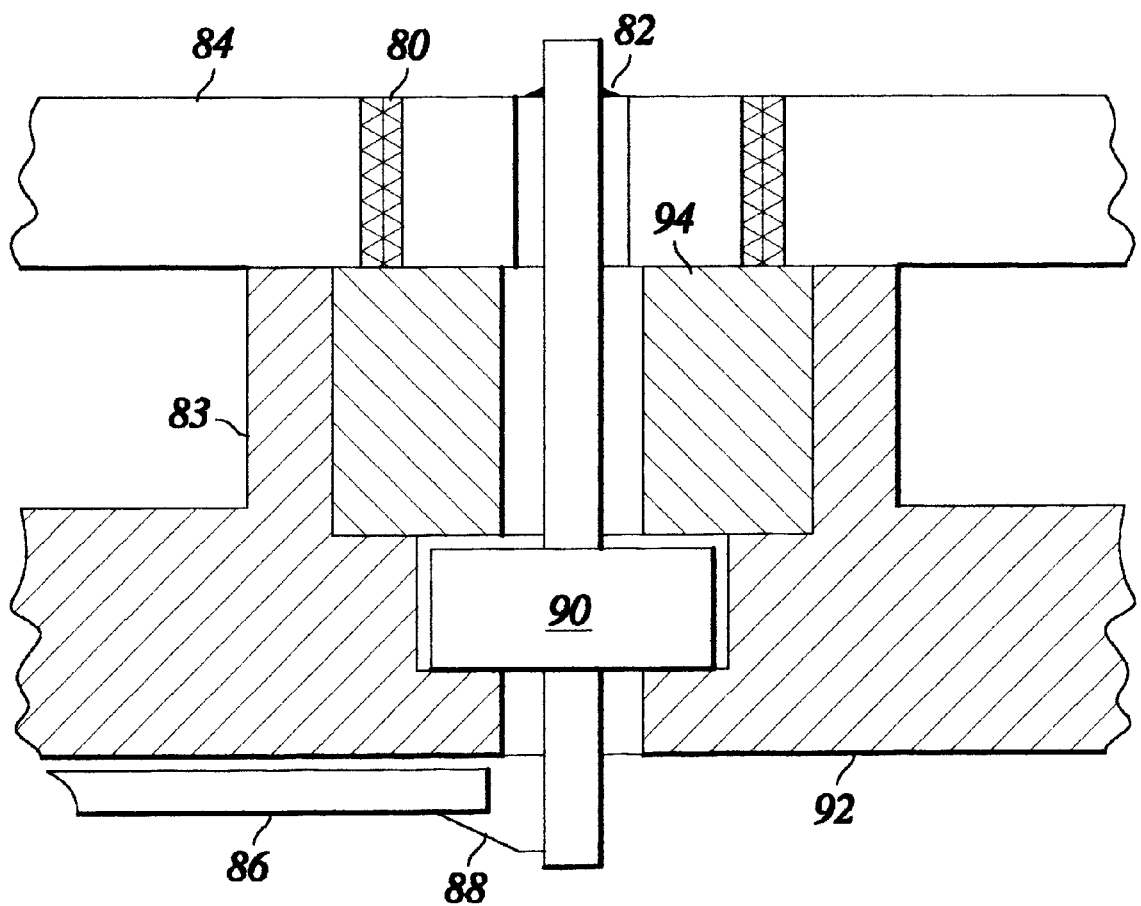
FIG. 2 is a cross sectional side view of the microwave feed through thereof.

The device and method for modifying a frequency range of a radio transceiver according to the present invention are illustrated in FIGS. 1 and 2, which depict a presently preferred embodiment thereof. Referring now to FIG. 1, the radio signal at the normal frequency, e.g., 2,400 MHz is provided to I/O port 16 during transmission. During reception, the received signal, operating frequency of the transceiver (5,800 MHz), is provided at I/O port 66. The 5,800 MHz signal whether transmitted or received is always at the port 66 (or the antenna) side of the transceiver. Additionally, 12 volts DC is provided at the I/O port 16 to facilitate operation of the circuitry of the present invention. Inductor 12 allows the 12 volts to be tapped from the I/O port 16 while inhibiting the radio frequency signal from being tapped along therewith. Capacitor 10 shorts undesirable high frequencies to ground. Capacitor 14 tends to allow the radio frequency signal to pass into the transmit detect circuitry 26, while inhibiting the transmission of the 12 volt DC signal thereinto. Within the transmit detect circuit 26, modified Lange coupler 20 facilitates the tapping of the RF signal so as to determine the presence of a preamble which indicates that a transmission from the transceiver is about to begin. This preamble is then transmitted to detect logic where it effects switching of switches 28 and 66 according to well known principles. A portion of the 2,400 MHz radio frequency signal passes through the modified Lange coupler 20 to the first switch 28. The first switch 28 switches either the transmit chain 64 or the receive chain 40 into electrical communication with the radio transceiver. Similarly, the second switch 66 places either the transmit chain 64 or the receive chain 40 in electrical communication with the antenna. Both switches are driven simultaneously.

Alternately, the first 28 and second 66 switches could be configured so as to bypass the transmit chain 64 and the receive chain 40 altogether by providing a third or straight through position for each switch, thereby facilitating normal operation of the transceiver at its original operating frequency. Further, as those skilled in the art will appreciate, first switch 28 and second switch 66 may be configured so as to switch among multiple transmit chains 64 and/or receive chains 40 so as to facilitate operation of the radio transceiver at a plurality of different desired radio frequencies.

During the transmission of a radio frequency signal, the first switch 28 places the radio transceiver in electrical communication with the transmit chains 64 such that the 2,400 MHz transmit signal is applied to mixer 52 where, according to well known principles, it is mixed with the output of local oscillator 49 to form the new, desired frequency for transmission.

The output of local oscillator 49 is preferably fed into band pass filter 48 to eliminate any undesirable frequencies therefrom. The output of band pass 48 is then applied to amplifier 46 and splitter 44. Splitter 44 applies the output of amplifier 46 to both amplifier 50 and amplifier 42. Amplifier 50 applies the local oscillator signal to mixer 52. Similarly, amplifier 42 applies the local oscillator output 49 to mixer 32 so as to facilitate the reception of a signal at a desired frequency.

According to the preferred embodiment of the present invention, the output of mixer 52 is provided to band pass filter 54 for eliminating any undesirable frequencies therefrom and then amplified via amplifiers 55, 56, and 60. Next, the output of amplifier 60 is preferably low pass filtered to eliminate any harmonics generated during amplification thereof and then is routed to the antenna via second switch 66. During receive operation of the present invention, the first switch 28 connects the output of the receive chain to the radio transceiver and the second switch 66 connects the antenna to the receive chain 40. Thus, a received signal, at 5,800 MHz, for example, is applied to the first 36 and second 38 amplifiers. The output of the second amplifier 38 is preferably applied to band pass filter 34 so as to remove any undesirable frequencies therefrom and then applied to mixer 32 where it is combined with the output of local oscillator 49 so as to form a new frequency, 2,400 MHz for example, the output of the mixer 32 is then preferably provided to amplifier 30, the output of which is applied to first switch 28 such that it is routed back to the radio transceiver.

According to the preferred embodiment of the present invention detect logic detects the presence of a preamble or predetermined signal in a transmission from the radio transceiver, so as to effect switching of the first 28 and second 66 switches to the transmit positions thereof. However, as those skilled in the art will appreciate, the first 28 and second 66 switches may also be manually controlled to effect transmission when desired.

According to the preferred embodiment of the present invention, the present invention is a completely remote device, preferably mounted at the top of the antenna tower, at the antenna feed and requiring no external control signals. Only the 12 VDC is needed so as to facilitate the internal generation of +5 V, −5 V, +8 V, and TTL voltage levels necessary to facilitate operation of the transmit chain 64, receive chain 40, local oscillator 49, and first 28 and second 66 switches.

Thus, the present invention facilitates the use of a 2.4 GHz transceiver for radio operations in the 5.8 GHz ISM band without changing existing transceiver hardware.

Referring now to FIG. 2, according to the present invention a machined aluminum microwaved housing 92 contains a coaxial feedthrough structure comprised of a ceramic microwave filter 48, a gold ribbon interconnect 88, a 50 ohms glass feedthrough 90, an aluminum doughnut 94, gold plated ground vias 80, and gold/tin solder 82.

The printed wiring board, preferably an FR-4 PWB 84 is supported upon a boss 83 formed in the machined aluminum housing 92. The aluminum doughnut 94 and the 50 ohm glass feed through 90 are seated within counter board formed in the boss 83 and are preferably soldered in place.

The construction facilitates the use of a very low cost local oscillator (LO) which may be formed upon the printed wiring board utilizing surface-mount devices.

The aluminum doughnut 94 maintains a 50 ohm impedance in air. The low dielectric constant of the FR-4 printed wiring board is designed as a coaxial feedthrough using the gold plated via holes 80 so as to provide a ground shield.

According to the preferred embodiment of the present invention, a switching speed of less than 60 nanoseconds ensures a low block error rate (BER).

According to the preferred embodiment of the present invention, the micro-miniature band pass filters 34, 48, 54, are printed on thin-film ceramic substrates to facilitate the elimination of any undesired spurious and harmonically related signals. Such filtering is desirable so as to maintain the small size of the module and also eliminates the need for expensive microwave cavity type filters, which are very bulky at the lower microwave (S and C-band) frequencies.

The present invention preferably comprises a GaAs MMIC chip set which makes up the radio frequency section of the transceiver module and utilizes compact circuit structures designed without the use of backside ground vias to reduce the size and cost of the devices.

The machined aluminum housing 92 also provides durability for outdoor use or severe environmental conditions. As those skilled in the art will appreciate, aluminum is a relatively cheap, lightweight material which can easily be machined and plated with a conductor having better conductivity than the aluminum itself. Preferably, a nickel based barrier layer is preplated prior to the gold plating operation. Such construction helps plating adhesion for the gold and also helps mitigate corrosion of the aluminum.

The FR-4 printed wiring board is a low dielectric constant printed wiring board material which is commonly used in the electronics industry. FR-4 is a very cheap material utilized extensively in PC board applications. It has very good performance characteristics for radio frequency signal transmission up to about 3,000 MHz, and can be successfully used beyond that, to approximately 6,000 MHz, if the radio frequency transmission lines are very carefully designed. At higher frequencies, other materials have superior RF performance in terms of insertion loss, but are also more expensive.

The band pass filters 34, 48, and 54 are preferably formed upon an alumina substrate. Alumina is a trade name for Aluminum Oxide ($Al_2O_3$). Alumina is a ceramic material which is fired at an extremely high temperature and is commonly used to fabricate microwave substrates. It is preferably approximately 99.6% purity and if finally polished so as to facilitate the formation of very fine line circuit geometries on the order of 0.0005 inches in width and spacings less than 0.0005 inch.

Thin film wet chemistry etching is preferably utilized to fabricate the microwave circuit patterns upon the Alumina substrate. According to the preferred embodiment of the present invention, a Titanium/Tungsten (TiW) barrier is applied to aid in adhesion and then gold is sputtered onto the substrate to form the desired patterns. Chemicals such as Sulfuric acid and Hydrochloric acid are then used to etch or remove undesired portions of the gold and the Titanium/Tungsten from the substrate to subtractively create the desired circuit patterns according to the well known etched back process.

Alternatively, a plate up process may be utilized wherein hybrid circuits are fabricated using a 96% Alumina substrate. This is typically referred to as a thick film technique resulting in geometries which are less fine (having line widths and spacings typically on the order of a few thousands of an inch) because the 96% Alumina can not be polished as flat as the 99.6% Alumina.

It is understood that these exemplary apparatus and method for modifying a frequency range of a radio transceiver described herein and shown in the drawings represents only a presently preferred embodiment of the invention. Indeed, various modifications and additions may be made to such embodiment without departing from the spirit and scope of the invention. For example, those skilled in the art will appreciate that various techniques, other than superheterodyning may be utilized so as to effect the desired changes of frequency. Also, various means of controlling switching between transmit and receive, as well as between normal operation and frequency conversion are likewise contemplated. Thus, these and other modifications and additions may be obvious to those skilled in the art and may be implemented to adapt the present invention for use in a variety of different applications.

What is claimed is:

1. A device for modifying a frequency range of a radio transceiver, the device comprising:
   a) a first superheterodyne circuit for changing a transmit frequency of the transceiver;
   b) a second superheterodyne circuit for changing a receive frequency of the transceiver; and
   c) at least one switch for switching the first and second superheterodyne circuits into and out of electrical communication with the transceiver and an antenna;
   d) wherein the first superheterodyne circuit, the second superheterodyne circuit, and the switch(es) are configured to mount to the transceiver and the antenna and to receive power from an antenna feed conductor; and
   e) wherein one of the switches comprises a switch configured to automatically place the radio transceiver in electrical communication with the first superheterodyne circuit when the radio transceiver is transmitting, by sensing a preamble signal from the radio transceiver.

2. The device as recited in claim 1, wherein:
   a) the first superheterodyne circuit comprises:
      i) a local oscillator having a output; and
      ii) a mixer for mixing the output of the local oscillator with a signal from the transceiver to be transmitted;
   b) the second superheterodyne circuit comprises:
      i) a local oscillator having an output; and
      ii) a mixer for mixing the output of the local oscillator with a signal received by the antenna.

3. The device as recited in claim 1, wherein:
   a) the first superheterodyne circuit comprises:
      i) a local oscillator having a output;
      ii) a mixer for mixing the output of the local oscillator with a signal from the transceiver to be transmitted;
      iii) a band pass filter for filtering unwanted mixing components the mixed signal from the mixer;
      iv) at least one amplifier for amplifying the mixed signal;
      v) a low pass filter for filtering harmonics form the amplified mixed signal;
   b) the second superheterodyne circuit comprises:
      i) at least one amplifier for amplifying a received radio frequency signal from the antenna;
      ii) a local oscillator having an output; and
      iii) a mixer for mixing the output of the local oscillator with the amplified signal received by the antenna.

4. The device as recited in claim 1, wherein the local oscillator of the first superheterodyne circuit and the local oscillator of the second superheterodyne circuit comprise a common local oscillator.

5. The device as recited in claim 1, wherein the local oscillator of the first superheterodyne circuit and the local oscillator of the second superheterodyne circuit comprise a common local oscillator comprised of surface mount devices formed upon a printed wiring board (PWB).

6. The device as recited in claim 1, wherein:
   a) the first superheterodyne circuit is configured to convert a signal being transmitted in the 2,400–2,488.35 MHz band to a signal in the 5,725–5,850 MHz band; and
   b) the second superheterodyne circuit is configured to convert a signal being received in the 5,725–5,850 MHz band to a signal in the 2,400–2,488.35 MHz band.

7. The device as recited in claim 1, further comprising an aluminum housing within which the first superheterodyne circuit, the second superheterodyne circuit, and the switch (es) are disposed.

8. The device as recited in claim 1, further comprising:
   a) a conductive housing within which the first superheterodyne circuit, the second superheterodyne circuit, and the switches are disposed; and
   b) a first coaxial feedthrough configured to provide a 50 ohm impedance for facilitating electrical connection of the first superheterodyne circuit, the second superheterodyne circuit, and the switches to the transceiver; and
   c) a second coaxial feedthrough configured to provide a 50 ohm impedance for facilitating electrical connection of the first superheterodyne circuit, the second superheterodyne circuit, and the switches to the antenna.

9. The device as recited in claim 1, further comprising:
a) a conductive housing within which the first superheterodyne circuit, the second superheterodyne circuit, and the switches are disposed; and
b) a first coaxial feedthrough configured to provide a 50 ohm impedance for facilitating electrical connection of the first superheterodyne circuit, the second superheterodyne circuit, and the switches to the transceiver; and
c) a second coaxial feedthrough configured to provide a 50 ohm impedance for facilitating electrical connection of the first superheterodyne circuit, the second superheterodyne circuit, and the switches to the antenna;
d) wherein the first coaxial feedthrough and the second coaxial feedthrough both comprise a glass dielectric soldered to the conductive housing and a generally toroidal conductive element soldered to the conductive housing so as to maintain a 50 ohm impedance in air.

10. The device as recited in claim 1, wherein the first superheterodyne circuit and the second superheterodyne circuit are formed upon a low dielectric constant printed wiring board (PWB).

11. The device as recited in claim 1, wherein the first superheterodyne circuit and the second superheterodyne circuit are formed upon a low dielectric constant FR-4 printed wiring board (PWB).

12. The device as recited in claim 1, wherein one of the switches comprises a switch configured to automatically place the radio transceiver in electrical communication with the first superheterodyne circuit when the radio transceiver is transmitting.

13. The device as recited in claim 1, wherein one of the switches comprises a switch configured to automatically place the radio transceiver in electrical communication with the first superheterodyne circuit within 60 nanoseconds when the radio transceiver is transmitting, by sensing a preamble signal from the radio transceiver.

14. The device of as recited in claim 1 further comprising a coaxial cable having a center conductor formed therein, the center conductor being in electrical communication with the first superheterodyne circuit, second superheterodyne circuit, and the switch(es), to communicate DC power and control signals thereto, the coaxial cable further being operative to facilitate electrical communication between the antenna and the radio transceiver.

15. A method for modifying a frequency range of a radio transceiver, the method comprising the steps of:
a) changing a transmit frequency of the transceiver via a first superheterodyne circuit;
b) changing a receive frequency of the transceiver via a second superheterodyne circuit; and
c) switching the first and second superheterodyne circuits into and out of electrical communication with the transceiver and an antenna; and
d) automatically placing the radio transceiver in electrical communication with the first superheterodyne circuit when the radio transceiver is transmitting by sensing a preamble signal from the radio transceiver;
e) wherein the first superheterodyne circuit, the second superheterodyne circuit, and the switch(es) are configured to mount to the transceiver and the antenna and to receive power from an antenna feed conductor.

16. The method as recited in claim 15, wherein:
a) the step of changing a transmit frequency of the transceiver via a first superheterodyne circuit comprises:
i) providing a local oscillator output; and
ii) mixing the local oscillator output with a signal from the transceiver to be transmitted;
b) the step of changing a receive frequency of the transceiver via a second superheterodyne circuit comprises:
i) providing a local oscillator output; and
ii) mixing the output of the local oscillator with a signal received by the antenna.

17. The method as recited in claim 15, wherein:
a) the step of changing a transmit frequency of the transceiver via a first superheterodyne circuit comprises:
i) providing a local oscillator output;
ii) mixing the output of the local oscillator with a signal from the transceiver to be transmitted;
iii) filtering unwanted mixing components the mixed signal from the mixer;
iv) amplifying the mixed signal;
v) filtering harmonics form the amplified mixed signal;
b) the step of changing a receive frequency of the transceiver via a second superheterodyne circuit comprises:
i) amplifying a received radio frequency signal from the antenna;
ii) providing a local oscillator output; and
iii) mixing the output of the mixer with the amplified signal received by the antenna.

18. The method as recited in claim 17, wherein the steps of providing a local oscillator for the first superheterodyne circuit and providing a local oscillator for the second superheterodyne circuit comprise providing a common local oscillator.

19. The method as recited in claim 15, wherein the steps of providing a local oscillator for the first superheterodyne circuit and providing a local oscillator for the second superheterodyne circuit comprise providing a common local oscillator comprised of surface mount devices formed upon a printed wiring board (PWB).

20. The method as recited in claim 15, wherein:
a) the step of changing a transmit frequency of the transceiver comprises converting a signal being transmitted in the 2,400–2,488.35 MHz band to a signal in the 5,725–5,850 MHz band; and
b) the step of changing a receive frequency of the transceiver comprises converting a signal being received in the 5,725–5,850 MHz band to a signal in the 2,400–2,488.35 MHz band.

21. The method as recited in claim 15, further comprising the step of providing DC power and control signals to the first superheterodyne circuit, the second superheterodyne circuit, and at least one switch via a single +12 volt input which is fed thereto on a center conductor of a coaxial cable which facilitates connection of the antenna to the radio transceiver.

22. The method as recited in claim 15, further comprising the step of disposing the first superheterodyne circuit, the second superheterodyne circuit, and at least one switch within an conductive housing.

23. The method as recited in claim 15, further comprising the steps of:
a) disposing the first superheterodyne circuit, the second superheterodyne circuit, and the switches within a conductive housing; and
b) forming a first coaxial feedthrough having a 50 ohm impedance in the housing for facilitating electrical connection of the first superheterodyne circuit, the second superheterodyne circuit, and the switches to the transceiver; and c) forming a second coaxial feedthrough having a 50 ohm impedance for facilitating electrical connection of the first superheterodyne circuit, the second superheterodyne circuit, and the switches to the antenna.

24. The method as recited in claim 15, further comprising the steps of:
   a) disposing the first superheterodyne circuit, the second superheterodyne circuit, and the switches within a conductive housing; and
   b) providing a first coaxial feedthrough configured to provide a 50 ohm impedance in the housing for facilitating electrical connection of the first superheterodyne circuit, the second superheterodyne circuit, and the switches to the transceiver; and
   c) providing a second coaxial feedthrough configured to provide a 50 ohm impedance in the housing for facilitating electrical connection of the first superheterodyne circuit, the second superheterodyne circuit, and the switches to the antenna;
   d) wherein the first coaxial feedthrough and the second coaxial feedthrough both comprise a glass dielectric soldered to the conductive housing and a generally toroidal conductive element soldered to the conductive housing so as to maintain a 50 ohm impedance in air.

25. The method as recited in claim 15, further comprising the step of forming the first superheterodyne circuit and the second superheterodyne circuit upon a low dielectric constant printed wiring board (PWB).

26. The method as recited in claim 15, further comprising the step of forming the first superheterodyne circuit and the second superheterodyne circuit upon a low dielectric constant FR-4 printed wiring board (PWB).

27. The method as recited in claim 15, further comprising the step of automatically placing the radio transceiver in electrical communication with the first superheterodyne circuit when the radio transceiver is transmitting.

28. The method as recited in claim 15, further comprising the step of automatically placing the radio transceiver in electrical communication with the first superheterodyne circuit within 60 nanoseconds when the radio transceiver is transmitting, by sensing a preamble signal from the radio transceiver.

29. A device for modifying a frequency range of a radio transceiver, the device comprising:
   a) a first superheterodyne circuit for changing a transmit frequency of the transceiver;
   b) a second superheterodyne circuit for changing a receive frequency of the transceiver; and
   c) at least one switch for switching the first and second superheterodyne circuits into and out of electrical communication with the transceiver and an antenna;
   d) wherein the first superheterodyne circuit, the second superheterodyne circuit, and the switch(es) are configured to mount to the transceiver and the antenna and to receive power from an antenna feed conductor;
   e) a conductive housing within which the first superheterodyne circuit, the second superheterodyne circuit, and the switches are disposed;
   f) a first coaxial feedthrough configured to provide a 50 ohm impedance for facilitating electrical connection of the first superheterodyne circuit, the second superheterodyne circuit, and the switches to the transceiver; and
   g) a second coaxial feedthrough configured to provide a 50 ohm impedance for facilitating electrical connection of the first superheterodyne circuit, the second superheterodyne circuit, and the switches to the antenna;
   h) wherein the first coaxial feedthrough and the second coaxial feedthrough both comprise a glass dielectric soldered to the conductive housing and a generally toroidal conductive element soldered to the conductive housing so as to maintain a 50 ohm impedance in air.

30. A method for modifying a frequency range of a radio transceiver, the method comprising the steps of:
   a) changing a transmit frequency of the transceiver via a first superheterodyne circuit;
   b) changing a receive frequency of the transceiver via a second superheterodyne circuit; and
   c) switching the first and second superheterodyne circuits into and out of electrical communication with the transceiver and an antenna;
   d) wherein the first superheterodyne circuit, the second superheterodyne circuit, and the switch(es) are configured to mount to the transceiver and the antenna and to receive power from an antenna feed conductor;
   e) disposing the first superheterodyne circuit, the second superheterodyne circuit, and the switches within a conductive housing;
   f) providing a first coaxial feedthrough configured to provide a 50 ohm impedance in the housing for facilitating electrical connection of the first superheterodyne circuit, the second superheterodyne circuit, and the switches to the transceiver; and
   g) providing a second coaxial feedthrough configured to provide a 50 ohm impedance in the housing for facilitating electrical connection of the first superheterodyne circuit, the second superheterodyne circuit, and the switches to the antenna;
   h) wherein the first coaxial feedthrough and the second coaxial feedthrough both comprise a glass dielectric soldered to the conductive housing and a generally toroidal conductive element soldered to the conductive housing so as to maintain a 50 ohm impedance in air.

* * * * *